United States Patent
Bjerre (10) Patent No.: US 11,138,406 B2
(45) Date of Patent: Oct. 5, 2021

(54) METHOD AND FINGERPRINT SENSING SYSTEM FOR DETERMINING FINGER CONTACT WITH A FINGERPRINT SENSOR

(71) Applicant: FINGERPRINT CARDS AB, Gothenburg (SE)

(72) Inventor: Troels Bjerre, Valby (DK)

(73) Assignee: FINGERPRINT CARDS AB, Gothenburg (SE)

( * ) Notice: Subject to any disclaimer, the term of this patent is extended or adjusted under 35 U.S.C. 154(b) by 25 days.

(21) Appl. No.: 16/640,265

(22) PCT Filed: Sep. 3, 2018

(86) PCT No.: PCT/SE2018/050881
§ 371 (c)(1),
(2) Date: Feb. 19, 2020

(87) PCT Pub. No.: WO2019/050453
PCT Pub. Date: Mar. 14, 2019

(65) Prior Publication Data
US 2020/0364435 A1  Nov. 19, 2020

(30) Foreign Application Priority Data
Sep. 7, 2017 (SE) .................................. 1751085-0

(51) Int. Cl.
*G06K 9/00* (2006.01)
*G06T 7/11* (2017.01)
*G06K 9/46* (2006.01)

(52) U.S. Cl.
CPC ......... *G06K 9/0004* (2013.01); *G06K 9/0002* (2013.01); *G06K 9/00006* (2013.01);
(Continued)

(58) Field of Classification Search
CPC ......... G06K 9/00006–0012; G06K 2009/0006
See application file for complete search history.

(56) References Cited

U.S. PATENT DOCUMENTS 5,825,924 A * 10/1998 Kobayashi ......... G06K 9/00087
382/219
6,241,288 B1 * 6/2001 Bergenek ................ G07C 9/37
283/67

(Continued)

FOREIGN PATENT DOCUMENTS

CN     106055955 A    10/2016

OTHER PUBLICATIONS

PCT International Search Report and Written Opinion dated Sep. 28, 2018 for International Application No. PCT/SE2018/050881, 8 pages.

(Continued)

*Primary Examiner* — Patrick F Marinelli
(74) *Attorney, Agent, or Firm* — RMCK Law Group, PLC (57) ABSTRACT

The present disclosure relates to a method of determining that a finger is in stable contact with a surface covering a sensor area of a fingerprint sensor. The method comprises, by means of the fingerprint sensor, acquiring a time-sequence of images of the fingerprint of the received finger. The method also comprises, for each image of the time-sequence, dividing an image area of the image, corresponding to the sensor area of the fingerprint sensor, into a plurality of image regions (r), said regions partly overlapping each other and covering the whole image area. The method also comprises, based on image analysis of each of the plurality of image regions of each image of the time-sequence, determining that the finger is in stable contact with the surface covering the sensor area.

20 Claims, 5 Drawing Sheets

(52) U.S. Cl.
CPC ....... *G06K 9/00087* (2013.01); *G06K 9/4642* (2013.01); *G06T 7/11* (2017.01); *G06K 9/4652* (2013.01)

(56) References Cited

U.S. PATENT DOCUMENTS

| | | | | |
|---|---|---|---|---|
| 7,200,250 | B2* | 4/2007 | Chou | G06K 9/0002 |
| | | | | 382/124 |
| 9,390,306 | B2* | 7/2016 | Minteer | G06K 9/00013 |
| 9,424,458 | B1* | 8/2016 | Mather | G06K 9/00114 |
| 9,600,706 | B2* | 3/2017 | Hansen | G06K 9/00067 |
| 9,785,823 | B2* | 10/2017 | Mather | G06K 9/00107 |
| 10,268,862 | B2* | 4/2019 | Li | G06F 16/5838 |
| 10,339,360 | B2* | 7/2019 | Zhou | G06F 21/32 |
| 10,467,451 | B2* | 11/2019 | Zhou | G06F 3/042 |
| 10,733,468 | B2* | 8/2020 | Wu | G06K 9/00013 |
| 2002/0030359 | A1* | 3/2002 | Bergenek | G06F 21/34 |
| | | | | 283/68 |
| 2004/0234110 | A1* | 11/2004 | Chou | G06K 9/0002 |
| | | | | 382/122 |
| 2006/0072795 | A1* | 4/2006 | Sano | G06K 9/00033 |
| | | | | 382/124 |
| 2006/0177113 | A1* | 8/2006 | Wrage | G06K 9/00067 |
| | | | | 382/124 |
| 2008/0205714 | A1 | 8/2008 | Benkley et al. | |
| 2015/0070137 | A1* | 3/2015 | Minteer | G06K 9/209 |
| | | | | 340/5.83 |
| 2015/0178542 | A1* | 6/2015 | Minteer | G06K 9/0002 |
| | | | | 382/124 |
| 2016/0110609 | A1* | 4/2016 | Lefebvre | G06K 9/00744 |
| | | | | 382/103 |
| 2016/0232401 | A1* | 8/2016 | Hoyos | G06K 9/00107 |
| 2016/0321496 | A1* | 11/2016 | Mather | G06K 9/00067 |
| 2017/0032165 | A1* | 2/2017 | Hansen | G06K 9/00013 |
| 2017/0330018 | A1* | 11/2017 | Li | G06K 9/036 |
| 2017/0344784 | A1* | 11/2017 | Zhou | G06F 3/042 |
| 2018/0060638 | A1* | 3/2018 | Zhou | G06K 9/00026 |
| 2019/0325242 | A1* | 10/2019 | Wu | G06K 9/00013 |
| 2020/0293746 | A1* | 9/2020 | Hu | G06F 3/04883 |
| 2020/0364430 | A1* | 11/2020 | Bjerre | G06K 9/00013 |
| 2020/0364435 | A1* | 11/2020 | Bjerre | G06K 9/00013 |

OTHER PUBLICATIONS

Extended European Search Report dated May 6, 2021 for EP Application No. 18854908.3, 9 pages.

* cited by examiner

METHOD AND FINGERPRINT SENSING SYSTEM FOR DETERMINING FINGER CONTACT WITH A FINGERPRINT SENSOR

CROSS-REFERENCE TO RELATED APPLICATIONS

This application is a 371 U.S. National Stage of International Application No. PCT/SE2018/050881, filed Sep. 3, 2018, which claims priority to Swedish Patent Application No. 1751085-0, filed Sep. 7, 2017. The disclosures of each of the above applications are incorporated herein by reference in their entirety.

TECHNICAL FIELD

The present disclosure relates to a method and to a fingerprint sensing system for determining that a finger is in stable contact with a surface covering a sensor area of a fingerprint sensor.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Fingerprint sensors can sometimes get activated prematurely, before the finger has made proper contact with the fingerprint sensor, or unintentionally, by a finger or other body part making contact with the fingerprint sensor by mistake, unnecessarily using up power and processing resources. It is preferable that a fingerprint sensor is only activated when a finger makes proper contact with it.

US 2015/0070137 discloses a method using electric field sensors for determining whether a sufficient part of the fingerprint sensor is covered by a finger, and whether the finger is in stable contact. It is determined whether a threshold number of subarrays from at least three of five regions of the fingerprint sensor have acquired finger stability data indicative of a finger. Then it is determined whether the finger is stable based upon whether the threshold number of sub-arrays indicates stability over successive data acquisitions.

SUMMARY

It is an objective of the present invention to provide an improved way of determining whether a fingerprint topology of a finger is in stable contact with a surface covering a sensor area of a fingerprint sensor.

It has now been realised that it may be desirable to further ensure that the fingerprint topography of a finger, typically the ridges thereof, is in contact with the detection surface of the fingerprint sensor over the whole sensor area, and that said contact is stable over time, before triggering e.g. an authentication operation to verify that the fingerprint topography of the finger, as sensed by the fingerprint sensor, corresponds with a stored representation of an enrolled fingerprint, indicating that the user to whom the finger belongs is authorised to e.g. interact in some preprogramed ways with an electronic device comprising the fingerprint sensor.

According to an aspect of the present invention, there is provided a method of determining that a finger is in stable contact with a surface covering a sensor area of a fingerprint sensor. The method comprises, on the surface of the fingerprint sensor, receiving the finger having a fingerprint topography. The method also comprises, by means of the fingerprint sensor, acquiring a time-sequence of images of the fingerprint of the received finger, said time-sequence comprising at least a first image taken at a first time point and a second image taken at a second time point which is after the first time point. The method also comprises, for each image of the time-sequence, dividing an image area of the image, corresponding to the sensor area of the fingerprint sensor, into a plurality of image regions, said regions partly overlapping each other and covering the whole image area. The method also comprises, based on image analysis of each of the plurality of image regions of each image of the time-sequence, determining that the finger is in stable contact with the surface covering the sensor area.

According to another aspect of the present invention, there is provided a computer program product comprising computer-executable components for causing a fingerprint sensing system to perform the method of any preceding claim when the computer-executable components are run on processing circuitry comprised in the fingerprint sensing system.

According to another aspect of the present invention, there is provided a fingerprint sensing system comprising a fingerprint sensor, processing circuitry, and data storage storing instructions executable by said processing circuitry whereby said fingerprint sensing system is operative to, on the surface of the fingerprint sensor, receive a finger having a fingerprint topography. The fingerprint sensing system is also operative to, by means of the fingerprint sensor, acquire a time-sequence of images of the fingerprint of the received finger, said time-sequence comprising at least a first image taken at a first time point and a second image taken at a second time point which is after the first time point. The fingerprint sensing system is also operative to, for each image of the time-sequence, divide an image area of the image, corresponding to a sensor area of the fingerprint sensor, into a plurality of image regions, said regions partly overlapping each other and covering the whole image area. The fingerprint sensing system is also operative to, based on image analysis of each of the plurality of image regions of each image of the time-sequence, determine that the finger is in stable contact with the surface covering the sensor area.

According to another aspect of the present invention, there is provided an electronic device comprising an embodiment of the fingerprint sensing system of the present disclosure, and a device control unit configured to interact with the fingerprint sensing system.

If it is only checked that the fingerprint topography is only in stable contact with a few separate parts of the detection surface of the sensor area, nothing is known about whether the finger is also in stable contact with the detection surface of the sensor area between said parts. By dividing the image area, corresponding to the sensor area, into image regions which together cover the whole image area, the risk of not detecting non-contacted parts of the sensor area detection surface is reduced. However, a non-contacted part of the sensor area which extends over two adjacent, but not overlapping, image regions of the corresponding image area may still not trigger detection of the non-contacted part since the non-contacted part is divided between two or more regions, each only being affected to a relatively small degree. The solution of the present invention is to use overlapping regions, whereby there is increased probability that at least one of the regions is affected to such a degree that detection of the non-contacted part is made by image analysis. By analysing a time-sequence of a plurality of images, it is possible to determine whether the contact made by the fingerprint topography on the detection surface is stable over time.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 7a is a schematic flow chart of an embodiment of the present invention.

FIG. 7b is a schematic flow chart in more detail of a part of the flow chart of FIG. 7a.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
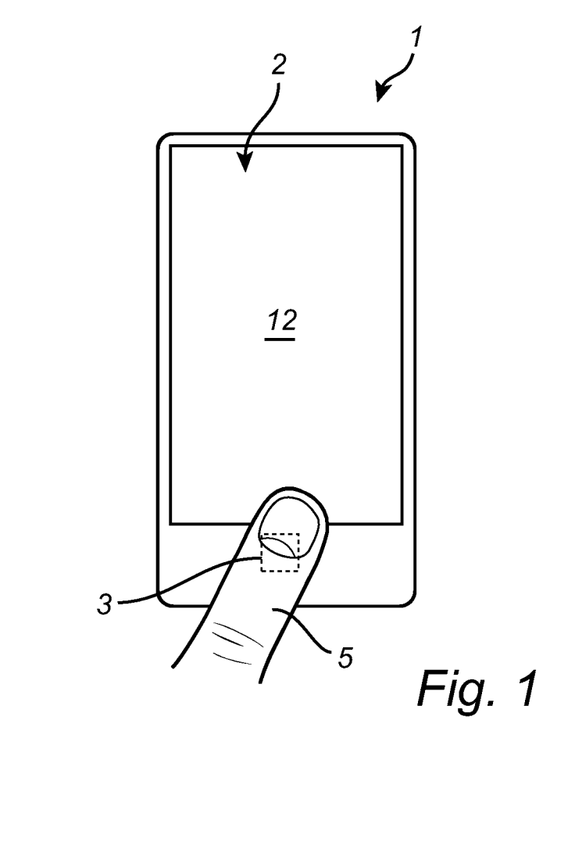
FIG. 1 schematically illustrates an electronic device including a fingerprint sensing device, in accordance with an embodiment of the present invention.

FIG. 1 shows an electronic device 1, here in the form of mobile phone, e.g. smartphone, comprising a display 12 of a display stack 2, e.g. comprising touch functionality (i.e. a touch display 12) and a fingerprint sensor 3. The fingerprint sensor 3 comprises fingerprint sensor circuitry, e.g. for outputting a grey-scale image or the like where different intensities in the image indicate the contact between a detection surface of the fingerprint sensor 3 and a finger 5 placed there on, e.g. as part of fingerprint authentication or navigation using the fingerprint sensor.

The fingerprint sensor 3 may operate according to any sensing technology. For instance, the finger print sensor may be a capacitive, optical or ultrasonic sensor. Herein, a capacitive fingerprint sensor, which may be preferred for some applications, is discussed as an example. The fingerprint sensor may comprise a two-dimensional array of fingerprint sensing elements, each corresponding to a pixel of the image outputted by the fingerprint sensor, the pixel e.g. being represented by a grey-scale value. The fingerprint sensor may be located at a side of the display stack 2, outside of the display area of the display 12, as shown in FIG. 1. The outputted image may for instance be in the form of a two-dimensional or one-dimensional pixel array, e.g. of grey-scale values. Each image pixel may provide an image intensity, be it of a grey-scale value or other value. For example, for a capacitive fingerprint sensor, a high pixel intensity (e.g. white in grey-scale) implies low capacitive coupling and thus a large sensed distance between the detection surface and the fingerprint topography. A high pixel intensity may result because the finger does not cover the part of the detection surface where the sensing element corresponding to the pixel is located. Conversely, a low pixel intensity (e.g. black in grey-scale) implies high capacitive coupling and thus a small sensed distance between the detection surface and the fingerprint topography. A high pixel intensity may result because the corresponding sensing element is located at a ridge of the fingerprint topography. An intermediate pixel intensity may indicate that the sensing element is covered by the finger topology but is located at a valley of the fingerprint topography.

Figure 2:
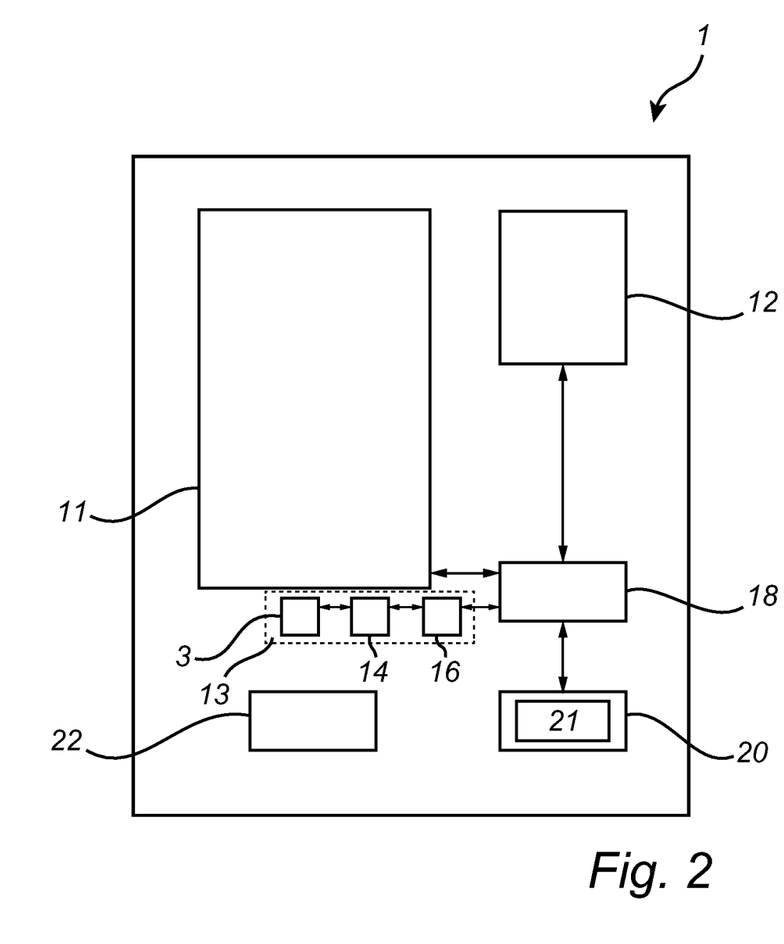
FIG. 2 is a schematic block diagram of the electronic device in FIG. 1.

Referring to the block diagram in FIG. 2, the electronic device 1 in FIG. 1 comprises the display stack 2 comprising a touch sensor ii and the display 12. The electronic device also comprises a fingerprint sensing system 13 comprising the fingerprint sensor 3, fingerprint image acquisition circuitry 14 and image processing circuitry 16. Further, the electronic device 1 comprises a data storage 20, e.g. in the form of a memory, which may be shared between different components of the electronic device, such as the fingerprint sensing system 13. The data storage 20 holds software 21, in the form of computer-executable components corresponding to instructions, e.g. for the fingerprint sensing system 13. Thus, the data storage 20 may functionally at least partly be comprised in the fingerprint sensing system 13.

Accordingly (see also FIGS. 3-5), embodiments of the fingerprint sensing system 13 comprises a fingerprint sensor 3, processing circuitry 16, and data storage 20 storing instructions 21 executable by said processing circuitry whereby said fingerprint sensing system is operative to, on the surface of the fingerprint sensor, receive a finger 5 having a fingerprint topography. The fingerprint sensing system is also operative to, by means of the fingerprint sensor, acquire a time-sequence 30 of images n..m of the fingerprint of the received finger, said time-sequence comprising at least a first image n taken at a first time point t1 and a second image n+1 taken at a second time point t2 which is after the first time point. The fingerprint sensing system is also operative to, for each image of the time-sequence, divide an image area 41 of the image, corresponding to a sensor area 42 of the fingerprint sensor, into a plurality of image regions r, said regions partly overlapping each other and covering the whole image area. The fingerprint sensing system is also operative to, based on image analysis of each of the plurality of image regions of each image of the time-sequence, determine that the finger is in stable contact with the surface covering the sensor area.

In some embodiments, the fingerprint sensor 3 is a capacitive, ultrasonic or optical fingerprint sensor, e.g. a capacitive fingerprint sensor.

In some embodiments, the fingerprint sensor 3 is covered by a glass layer, e.g. by means of a cover glass or a glass coating, e.g. protecting the sensing elements and providing the detection surface of the fingerprint sensor.

The data storage 20 may be regarded as a computer program product 20 comprising computer-executable components 21 for causing the fingerprint sensing system 13 to perform an embodiment of the method of the present disclosure when the computer-executable components are run on processing circuitry 16 comprised in the fingerprint sensing system. Additionally, any mobile or external data storage means, such as a disc, memory stick or server may be regarded as such a computer program product.

The electronic device also comprises a device control unit 18 configured to control the electronic device 1 and to interact with the fingerprint sensing system 13. The electronic device also comprises a battery 22 for providing electrical energy to the various components of the electronic device 1. Although not shown in FIG. 2, the electronic device may comprise further components depending on application. For instance, the electronic device 1 may comprise circuitry for wireless communication, circuitry for voice communication, a keyboard etc.

The electronic device 1 may be any electrical device or user equipment (UE), mobile or stationary, e.g. enabled to communicate over a radio channel in a communication network, for instance but not limited to e.g. mobile phone, tablet computer, laptop computer or desktop computer.

The electronic device 1 may thus comprise an embodiment of the fingerprint sensing system 13 discussed herein, and a device control unit 18 configured to interact with the fingerprint sensing system.

In some embodiments, the device control unit 18 is configured to interact with the fingerprint sensing system 13 to authenticate a user based on a fingerprint representation and perform at least one action in response to said authentication.

Figure 3:
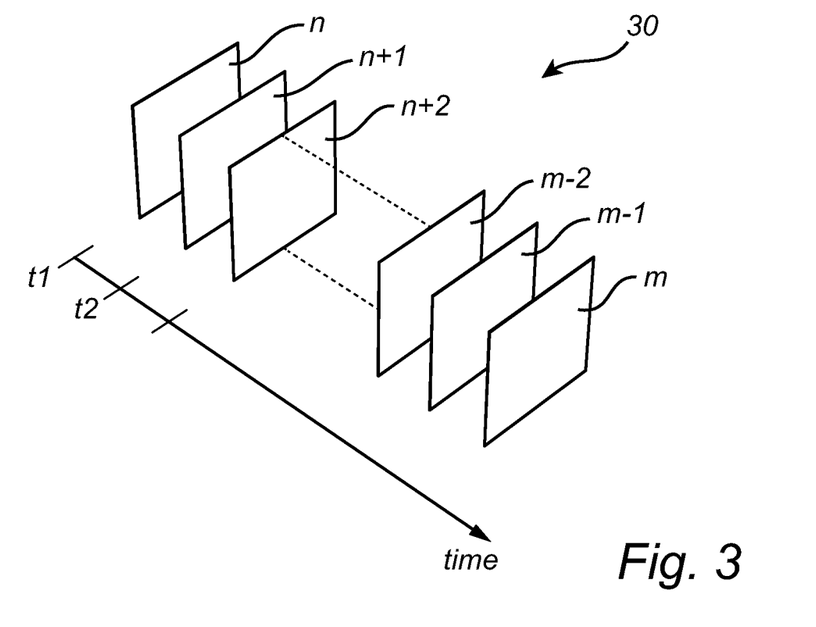
FIG. 3 schematically illustrates a time-sequence of images, in accordance with an embodiment of the present invention.

As a finger 5 contacts a detection surface of the fingerprint sensor 3, the fingerprint sensor is activated to by means of the fingerprint image acquisition circuitry 14 acquire an image n, or a time-sequence 30 of images n to m (herein also denoted n..m) as illustrated in FIG. 3. Such a time-sequence 30 may comprise at least a first image n, taken at a first time point t1, and a second image n+1, taken at a second time point t2 which is in time domain after the first time point t1. Embodiments of the present invention may be applied to any at least two, e.g. the first and the second, of the images n..m, e.g. n, n+1, n+2, m−2, m−1 or m as shown in FIG. 3. Typically, a plurality of serial images are analysed to determine that the fingerprint contact is stable over time.

Figure 4:
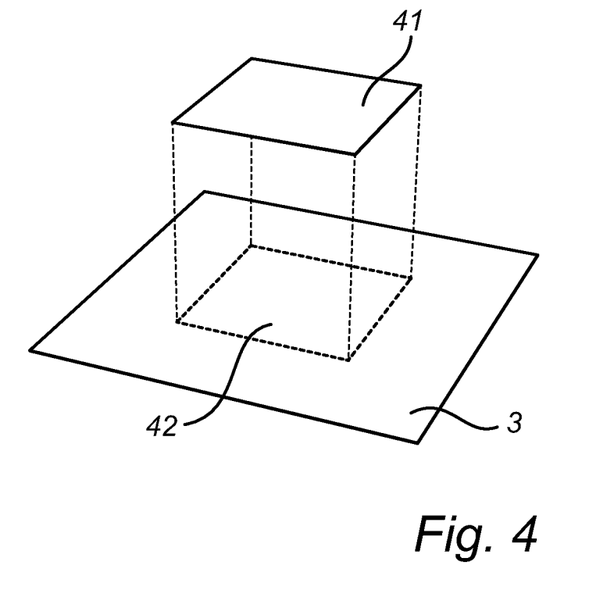
FIG. 4 schematically illustrates an image area corresponding to a sensor area of fingerprint sensor, in accordance with an embodiment of the present invention.

FIG. 4 illustrates how an image area 41 corresponds to a sensor area 42 of the detection surface of the fingerprint sensor 3. The image area 41 may be the whole or a part of the images n..m, and may correspond to the whole or a part of the detection surface of the fingerprint detector 3. In the example of FIG. 4, the sensor area 42 is a sub-area of the detection surface, why the image area 41 comprises only pixels from a subgroup of the sensing elements of the fingerprint sensor, typically those sensing elements positioned right underneath the sensor area 42.

Figure 5A:
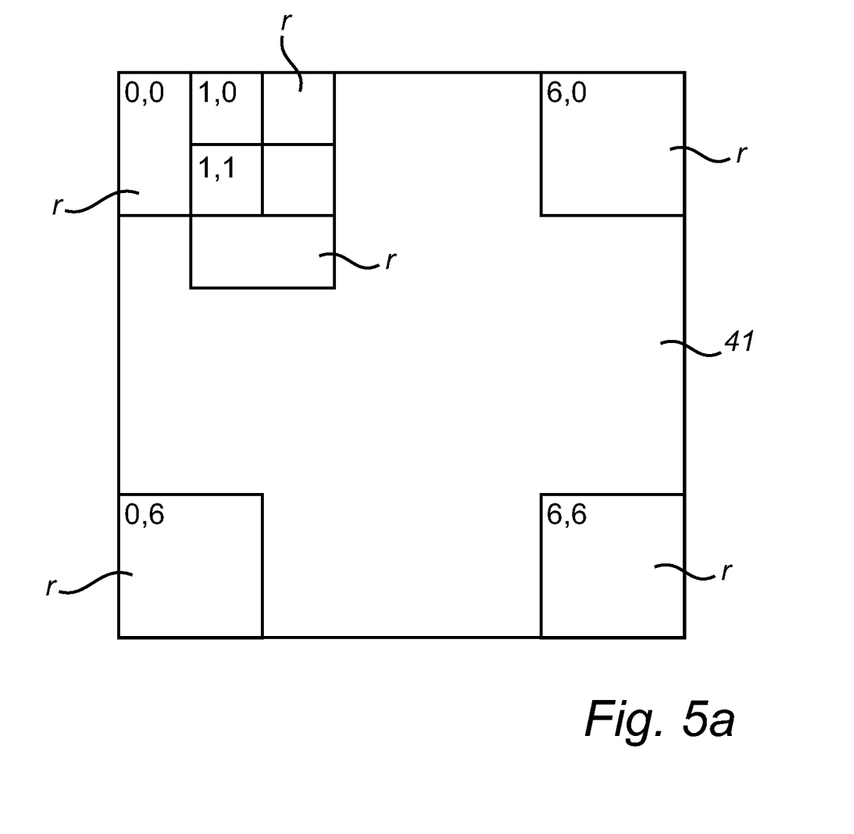
FIG. 5a illustrates an image area divided into overlapping image regions, in accordance with an embodiment of the present invention.

FIG. 5a shows an example of an image area 41 which has been schematically divided into a plurality of image regions r. To not clutter the figure, only a few of the image regions which the image area is divided into are shown. Coordinates of each image region r is given in the upper left corner of each image region. In the example of the figure, each image region is square, i.e. of 8×8 pixels, but any pixel ratio or number of pixels of each region r is possible. It may be convenient that all regions r are of the same size, but using different size regions may also be desirable in some embodiments. In the figure, the image area is divided into a total of 49 (7×7) image regions, with coordinates of 0 to 6 in each dimension, but any number of regions may be used, e.g. 25 (5×5) or 81(9×9) or more regions. The regions r are overlapping. Each region r may overlap with neighbouring regions in both dimensions of a two-dimensional image area 41, e.g. by at least 20, 30, 40 or 50%. In the example of FIG. 5a, each image region r overlaps by 50% with each of its closest neighbour images, i.e. having integer coordinates in any one of the two dimensions which is higher or lower by one.

Figure 5B:
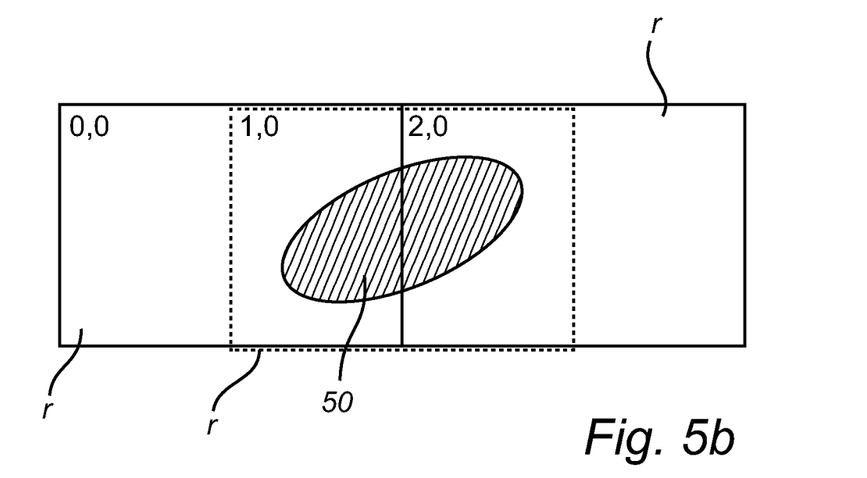
FIG. 5b illustrates a representation of an uncovered sensor area part in overlapping image regions.

An advantage with overlapping regions r is illustrated by means of FIG. 5b, in which three of the regions r of FIG. 5a are shown. A high-intensity part 50 of the image area 41, corresponding to a non-contacted part of the surface of the sensor area 42, is divided between the two non-overlapping regions r having the coordinates 0,0 and 2,0, respectively. Each of these two non-overlapping regions may only to a lesser degree comprise the high-intensity part 50, why an average intensity value of the region may not be affected by the high-intensity part to such a degree that detection of the high-intensity part, and thus the non-contacted part, is triggered. However, by using a third region r, having the coordinates 1,0 in this example, which overlaps both of the 0,0 and 2,0 regions, here by 50% each, this third region may to a larger degree comprise the high-intensity part and be affected by the high-intensity part to such a degree that detection of the high-intensity part, and thus the non-contacted part, is triggered.

Figure 6:
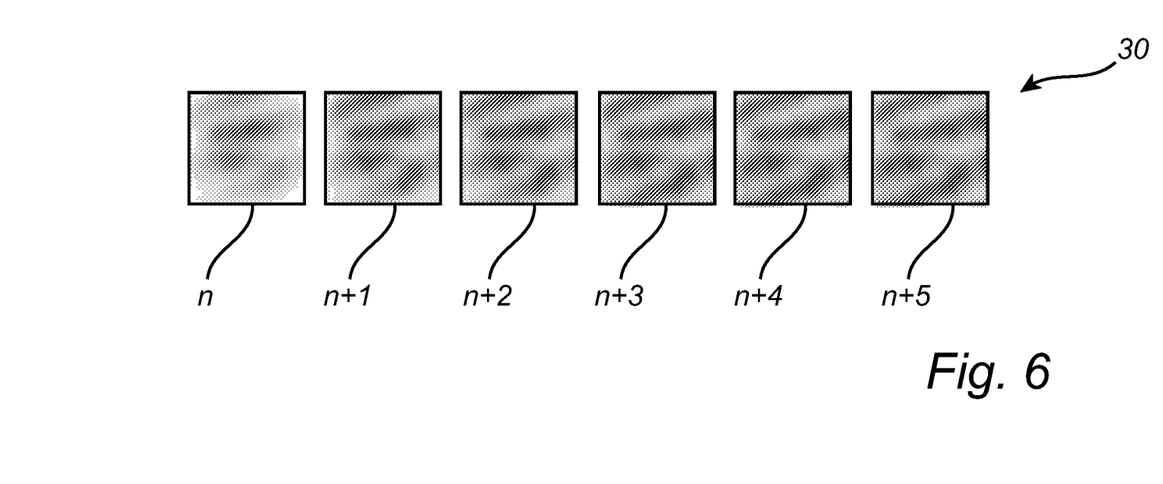
FIG. 6 shows a time-sequence of grey-scale images, in accordance with an embodiment of the present invention.

FIG. 6 shows a time-sequence 30 of grey-scale 32×32 pixel images n to n+5 from a capacitive fingerprint sensor 3 after activation. The sequence 30 of FIG. 6 illustrates how a finger 5 is only partly in stable contact with the detection surface, in this case with the middle part of the detection surface, in the first images while being in stable contact over the whole sensor area in the last images. The sequence of FIG. 6 appears to show a finger making contact first in the middle of the sensor area and then then also at its outer edges as the finger is more firmly pressed down against the detection surface.

Figures 7A, 7B:
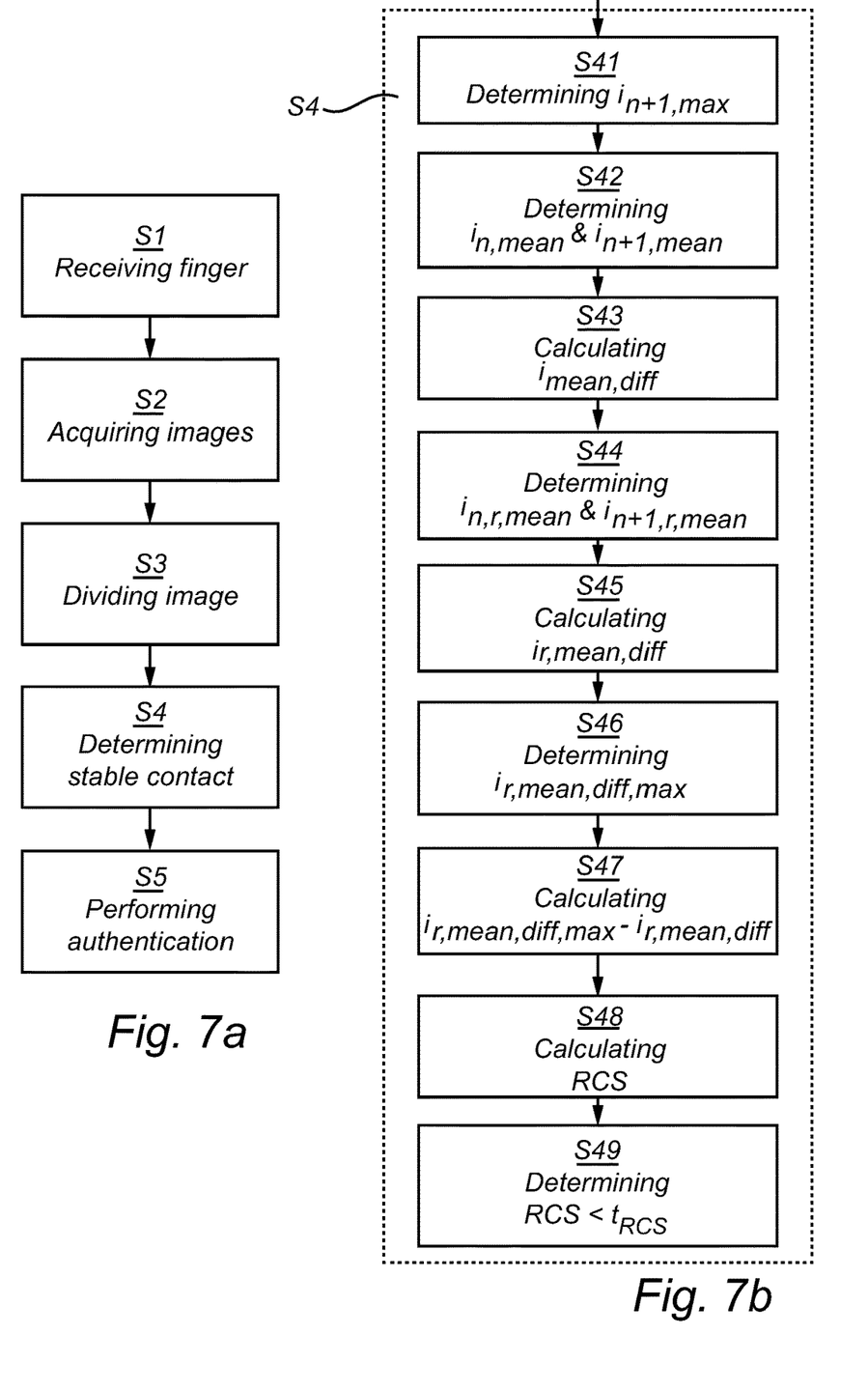

FIG. 7a is a flow chart of an embodiment of the method of the present invention. On a detection surface of the fingerprint sensor 3, a finger having a fingerprint topography is received S1. Then, by means of the fingerprint sensor 3, a time-sequence 30 of images n..m of the fingerprint of the received finger is acquired S2. The time-sequence comprises at least a first image n taken at a first time point t1 and a second image n+1 taken at a second time point t2 which is after the first time point. Then, for each image of the time-sequence 30, an image area 41 of the image, corresponding to the sensor area 42 of the fingerprint sensor 3, is divided S3 into a plurality of image regions r. The regions r are partly overlapping each other and together cover the whole image area 41. Based on image analysis of each of the plurality of image regions r of each image n..m of the time-sequence 30, it is then determined S4 that the finger 5, i.e. the ridges of the fingerprint topography, is in stable physical contact with the surface covering the sensor area, preferably over the whole sensor area 42.

In some embodiments, after the determining S4 that the finger 5 is in stable contact with the detection surface, an authentication operation is performed S5, including acquiring a fingerprint image of the received S1 finger and comparing said acquired fingerprint image with a stored representation of an enrolled fingerprint. As mentioned above, an authentication operation may be performed to verify that the fingerprint topography of the finger 5, as sensed by the fingerprint sensor 3, corresponds with a stored representation of an enrolled fingerprint, e.g. in the data storage 20, indicating that the user to whom the finger 5 belongs is authorised to e.g. interact in some preprogramed ways with the electronic device 1 comprising the fingerprint sensor.

Herein, embodiments of the present invention are exemplified by a time-sequence 30 comprising first and second images n and n+1, comparing said first and second images to determine whether the finger contact is stable. However, the time-sequence 30 may comprise any number of images, e.g. within the range of 2-10 images, and comparison may be performed between any of said images, e.g. between a first image n and a last image m of the sequence 30, or between a second image n+1 and third image n+2 e.g. if it has already been determined that the finger was not in stable contact between the first and second images n and n+1.

In some embodiments, the determining S4 that the finger is in stable contact is based on an average change in intensity $i_{mean,diff}$ in the image area 41 between the first and second images n and n+1, and on a change in intensity $i_{r,mean,diff}$ between the first and second images for each of the image regions r. The average intensity value $i_{mean}$ of the image area 41 may e.g. be an average grey-scale value of all pixels in the image area, or of groups of pixels in the image area. Thus, $i_{mean,diff}$ may e.g. be the $i_{mean}$ of image n ($i_{n,mean}$) subtracted by the $i_{mean}$ of image n+1 ($i_{n+1,mean}$). The average intensity value $i_{r,mean}$ of each region r may similarly be of grey-scale values of all pixels in the image region, or of groups of pixels in the image region. Thus, $i_{r,mean,diff}$ may e.g. be the $i_{r,mean}$ of image n ($i_{n,r,mean}$) subtracted by the $i_{r,mean}$ of image n+1 ($i_{n+1,r,mean}$).

Additionally or alternatively, in some embodiments, the determining S4 that the finger 5 is in stable contact is based on a maximum intensity value $i_{n+1,max}$ in the image area 41 of the second image n+1, and on a maximum value $i_{r,mean,diff,max}$ from changes in intensity $i_{r,mean,diff}$ between the first and second images n and n+1 for each of the image regions r. The maximum intensity value $i_{n+1,max}$ in the image area 41 may then e.g. be the highest grey-scale value of any pixel, or group of pixels, in the image area 41 of the second image n+1. As above, the change in intensity $i_{r,mean,diff}$ between the first and second images n and n+1 for each of the regions r may be calculated as $i_{r,mean}$ of image n ($i_{n,r,mean}$) subtracted by the $i_{r,mean}$ of image n+1 ($i_{n+1,r,mean}$). Then, the maximum value $i_{r,mean,diff,max}$ may be determined as e.g. the highest grey-scale value exhibited by the $i_{r,mean,diff}$ of any one of the regions r.

FIG. 7b is a flow chart illustrating an example of how it can be determined S4 that the finger is in stable contact with the detection surface covering the sensor area 42.

The image maximum intensity value $i_{n+1,max}$ in the image area 41 of the second image n+1 is determined S41.

For each of the first and second images n and n+1, the image average intensity value $i_{n,mean}$ and $i_{n+1,mean}$ of the image area 41 is determined S42. Then, for each of the first and second images n and n+1, the change $i_{mean,diff}$ of the image average intensity value $i_{n,mean}$ and $i_{n+1,mean}$ between the first and second images is calculated S43, e.g. as the $i_{mean}$ of image n ($i_{n,mean}$) subtracted by the $i_{mean}$ of image n+1 ($i_{n+1,mean}$) as discussed above.

For each of the regions r, of each of the first and second images n and n+1, the region average intensity value $i_{n,r,mean}$ and is determined S44.

Then, for each of the regions r, of each of the first and second images n and n+1, the change $i_{r,mean,diff}$ in the region average intensity value $i_{n,r,mean}$ and $i_{n+1,r,mean}$ between the first and second images n and n+1 is calculated S45, e.g. as the $i_{r,mean}$ of image n ($i_{n,r,mean}$) subtracted by the $i_{r,mean}$ of image n+1 ($i_{n+1,r,mean}$) as discussed above.

Further, the maximum region average change value $i_{r,mean,diff,max}$ from the calculated changes in region average intensity value $i_{r,mean,diff}$ is determined S46, e.g. as the highest grey-scale value exhibited by the $i_{r,mean,diff}$ of any one of the regions r as discussed above.

Then, a difference between the maximum region average change value $i_{r,mean,diff,max}$ and the change ($i_{mean,diff}$) of the image average intensity value is calculated S47. A ridge contact score (RCS) is calculated S48 as the ratio between the calculated S47 difference and the image maximum intensity value $i_{n+1,max}$. Thus, the $$RCS = \frac{i_{r,mean,diff,max} - i_{mean,diff}}{i_{n+1,max}}.$$

In alternative embodiments, the RCS may instead be calculated in relative terms as $$RCS = \frac{i_{r,mean,diff,max}}{i_{mean,diff}}.$$

It may then be determined S49 that the finger 5 is in stable contact with the detection surface covering the sensor area 42 when the RCS is below a predetermined threshold $t_{RCS}$. The RCS may for example be within the range of from 0.000 to 0.035 when the contact is stable, and the $t_{RCS}$ could be set within the range of from 0.037 to 0.041.

In some embodiments, the sensor area 42 covers the whole detection surface of the fingerprint sensor 3, i.e. the sensor area 42 is not a sub-area of the detections surface, whereby essentially all the sensing elements of the fingerprint sensor 3 are used to form pixels in the image area 41. In some other embodiments, the sensor area 42 covers only a part of the fingerprint sensor 3. It may e.g. be enough that the sensor area 42 covers only a part, such as 30, 50 or 70%, of the detection surface of the fingerprint sensor 3, e.g. depending on the size and/or resolution of the fingerprint sensor 3, in order to be enabled for an action, such as authentication as discussed herein.

The determining S4 that the finger 5 is in stable contact with the detection surface of the sensor area 42 may comprise determining that the finger is in contact with the surface of the fingerprint sensor 3 over the whole sensor area. Although some sensor technologies, e.g. capacitive, may allow for fingerprint sensing also when the fingerprint topography hovers just above the detection surface, it may be convenient, e.g. for obtaining a stable image n, that the fingerprint topography, typically the ridges thereof, is in direct physical contact with the detection surface. The detection surface may be provided by e.g. a cover glass or glass coating of the fingerprint sensor 3, protecting the fingerprint sensing elements.

As also discussed with reference to FIG. 5a, in some embodiments of the present invention, an overlap between at least two, e.g. called a first region and a second region, of the plurality of image regions r is at least 20%, such as at least 30, 40 or 50%. Preferably, each of the plurality of regions r has an overlap with all its immediate neighbours in both dimensions.

The image regions r may have any shape or size, but in some embodiments each of the plurality of image regions r has size of at least 8×8 pixels of the acquired image n. In some embodiments, each of the plurality of image regions r corresponds to a sensor region, being a sub-area of the sensor area 42, having a size of at least 0.48 mm times 0.48 mm of the sensor area.

As previously mentioned, the acquired images n..m, of an acquired time-sequence 30 of images, may be grey-scale images, typically two-dimensional but made into one-dimensional vectors for analysis.

In some embodiments, the time-sequence 30 of images n..m is acquired S2 at a rate of at least 20 images per seconds, such as at least 50 images per second, in order to quickly trigger authentication or other action once the finger contact is stable against the detection surface.

According to an example embodiment of the present invention, there is provided a method of determining that a finger 5 is in stable contact with a surface covering a sensor area 42 of a fingerprint sensor 3. The method comprises, by means of the fingerprint sensor, acquiring S2 a time-sequence 30 of images n..m of a fingerprint of the received finger. The method also comprises, for each image of the time-sequence, dividing S3 an image area 41 of the image, corresponding to the sensor area of the fingerprint sensor, into a plurality of image regions r, said regions partly overlapping each other and covering the whole image area. The method also comprises, based on image analysis of each of the plurality of image regions of each image of the time-sequence, determining S4 that the finger is in stable contact with the surface covering the sensor area.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method of determining that a finger is in stable contact with a surface covering a sensor area of a fingerprint sensor, the method comprising:
on the surface of the fingerprint sensor, receiving the finger having a fingerprint topography;
by means of the fingerprint sensor, acquiring a time-sequence of images of the fingerprint of the received finger, said time-sequence comprising at least a first image taken at a first time point and a second image taken at a second time point which is after the first time point;
for each image of the time-sequence, dividing an image area of the image, corresponding to the sensor area of the fingerprint sensor, into a plurality of image regions, said regions partly overlapping each other and covering the whole image area; and
based on image analysis of each of the plurality of image regions of each image of the time-sequence, determining that the finger is in stable contact with the surface covering the sensor area.

2. The method of claim 1, wherein the determining that the finger is in stable contact is based on an average change in intensity in the image area between the first and second images, and on a change in intensity between the first and second images for each of the image regions.

3. The method of claim 1, wherein the determining that the finger is in stable contact is based on a maximum intensity value in the image area of the second image and on a maximum value from changes in intensity between the first and second images for each of the image regions.

4. The method of claim 1, wherein the determining that the finger is in stable contact comprises calculating a ridge contact score; (RCS) as $$RCS = \frac{i_{r,mean,diff,max}}{i_{mean,diff}},$$

wherein $i_{r,mean,diff,max}$ is a maximum value from changes in intensity between the first and second images for each of the image regions, and $i_{mean,diff}$ is an average change in intensity in the image area between the first and second images.

5. The method of claim 1, wherein the determining that the finger is in stable contact comprises:
determining an image maximum intensity value in the image area of the second image;
for each of the first and second images,
determining an image average intensity value of the image area,
calculating a change of the image average intensity value between the first and second images, and
for each of the regions,
determining a region average intensity value and
calculating a change in the region average intensity value between the first and second images;
determining a maximum region average change value from the calculated changes in region average intensity value;
calculating a difference between the maximum region average change value and the change of the image average intensity value;
calculating a ridge contact score (RCS), $$RCS = \frac{i_{r,mean,diff,max} - i_{mean,diff}}{i_{n+1,max}},$$

as a ratio between said calculated difference and the image maximum intensity value; and
determining that the finger is in stable contact with the surface covering the sensor area when the RCS is below a predetermined threshold.

6. The method of claim 1, wherein the time-sequence of images is acquired at a rate of at least 20 images per seconds.

7. The method of claim 1, wherein the sensor area covers the whole fingerprint sensor.

8. The method of claim 1, wherein the sensor area covers only a part of the fingerprint sensor.

9. The method of claim 1, wherein an overlap between at least two of the plurality of image regions is at least 20%.

10. The method of claim 1, further comprising:
after the determining that the finger is in stable contact, performing an authentication operation including acquiring a fingerprint image of the received finger and comparing said acquired fingerprint image with a stored representation of an enrolled fingerprint.

11. The method of claim 1, wherein each of the plurality of image regions has size of at least 8×8 pixels of the acquired image.

12. The method of claim 1, wherein each of the plurality of image regions corresponds to a sensor region having a size of at least 0.48 times 0.48 mm of the sensor area.

13. The method of claim 1, wherein the plurality of image regions consists of at least 25 image regions.

14. The method of claim 1, wherein each of the acquired images of the time sequence is a gray-scale image.

15. A non-transitory computer-readable medium storing a computer program product comprising computer-executable components for causing a fingerprint sensing system to perform the method of claim 1 when the computer-executable components are run on processing circuitry comprised in the fingerprint sensing system.

16. A fingerprint sensing system comprising:
a fingerprint sensor;
processing circuitry; and
data storage storing instructions executable by said processing circuitry whereby said fingerprint sensing system is operative to:
on the surface of the fingerprint sensor, receive a finger having a fingerprint topography;
by means of the fingerprint sensor, acquire a time-sequence of images of the fingerprint of the received finger, said time-sequence comprising at least a first image taken at a first time point and a second image taken at a second time point which is after the first time point;
for each image of the time-sequence, divide an image area of the image, corresponding to a sensor area of the fingerprint sensor, into a plurality of image regions, said regions partly overlapping each other and covering the whole image area; and
based on image analysis of each of the plurality of image regions of each image of the time-sequence, determine that the finger is in stable contact with the surface covering the sensor area.

17. The fingerprint sensing system of claim 16, wherein the fingerprint sensor is a capacitive fingerprint sensor.

18. The fingerprint sensing system of claim 16, wherein the fingerprint sensor is covered by a glass layer.

19. An electronic device comprising:
the fingerprint sensing system of any claim 16; and
a device control unit configured to interact with the fingerprint sensing system.

20. The electronic device of claim 19, wherein the device control unit is configured to interact with the fingerprint sensing system to authenticate a user based on a fingerprint representation and perform at least one action in response to said authentication.

* * * * *